United States Patent [19]

Gutleber

[11] Patent Number: 4,549,303
[45] Date of Patent: Oct. 22, 1985

[54] MULTICHANNEL TIME DIVISION MULTIPLEXED TRUNK TRANSMISSION LINK

[75] Inventor: Frank S. Gutleber, Little Silver, N.J.

[73] Assignee: The United States of America as represented by the Secretary of the Army, Washington, D.C.

[21] Appl. No.: 565,806

[22] Filed: Dec. 27, 1983

[51] Int. Cl.⁴ .......................... H04J 3/10; H04J 13/00
[52] U.S. Cl. ........................................ 375/25; 375/38; 375/96; 375/103; 370/19
[58] Field of Search .................. 375/1, 25, 34, 38, 96, 375/102, 103; 370/6, 18, 19, 21, 104; 455/206, 284, 303, 305, 306; 340/348, 349, 350, 352, 355; 364/604, 728, 825, 826

[56] References Cited

U.S. PATENT DOCUMENTS

| | | | |
|---|---|---|---|
| 3,461,451 | 8/1969 | Gutleber | 340/348 |
| 3,519,746 | 7/1970 | Gutleber | 370/18 |
| 3,634,765 | 1/1972 | Gutleber | 375/96 |
| 3,908,088 | 9/1975 | Gutleber | 370/104 |
| 4,037,159 | 7/1977 | Martin | 375/1 |
| 4,301,530 | 11/1981 | Gutleber | 370/18 |
| 4,455,662 | 6/1984 | Gutleber | 370/18 |

OTHER PUBLICATIONS

*Communication Systems,* Carlson, A. Bruce, McGraw-Hill, Inc., 1975, "Time-Division Multiplexing", pp. 330-332.

Primary Examiner—Robert L. Griffin
Assistant Examiner—Raymond C. Glenny
Attorney, Agent, or Firm—Anthony T. Lane; Jeremiah G. Murray; Paul A. Fattibene

[57] ABSTRACT

A multichannel time division multiplexed (TDM) bit stream has specific channels selected by gating selected channel bits out of a composite group of channels. The selected channel bits are spread spectrum coded as multiplexed noise codes which are then used to modulate a transmitter for communicating the codes over a transmission link. The noise codes are then automatically compressed back to original channel bits at a receiver to provide output signals which are totally non-interfering with each other.

9 Claims, 6 Drawing Figures

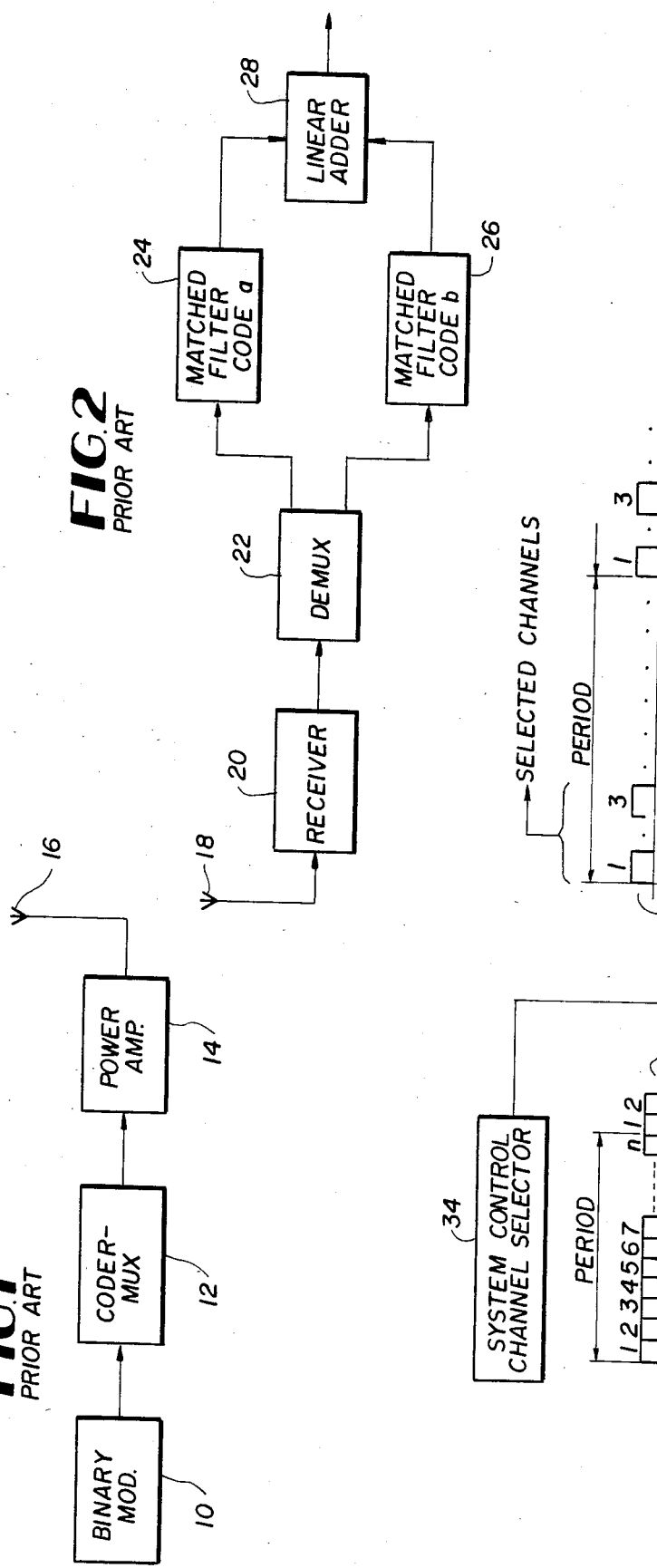

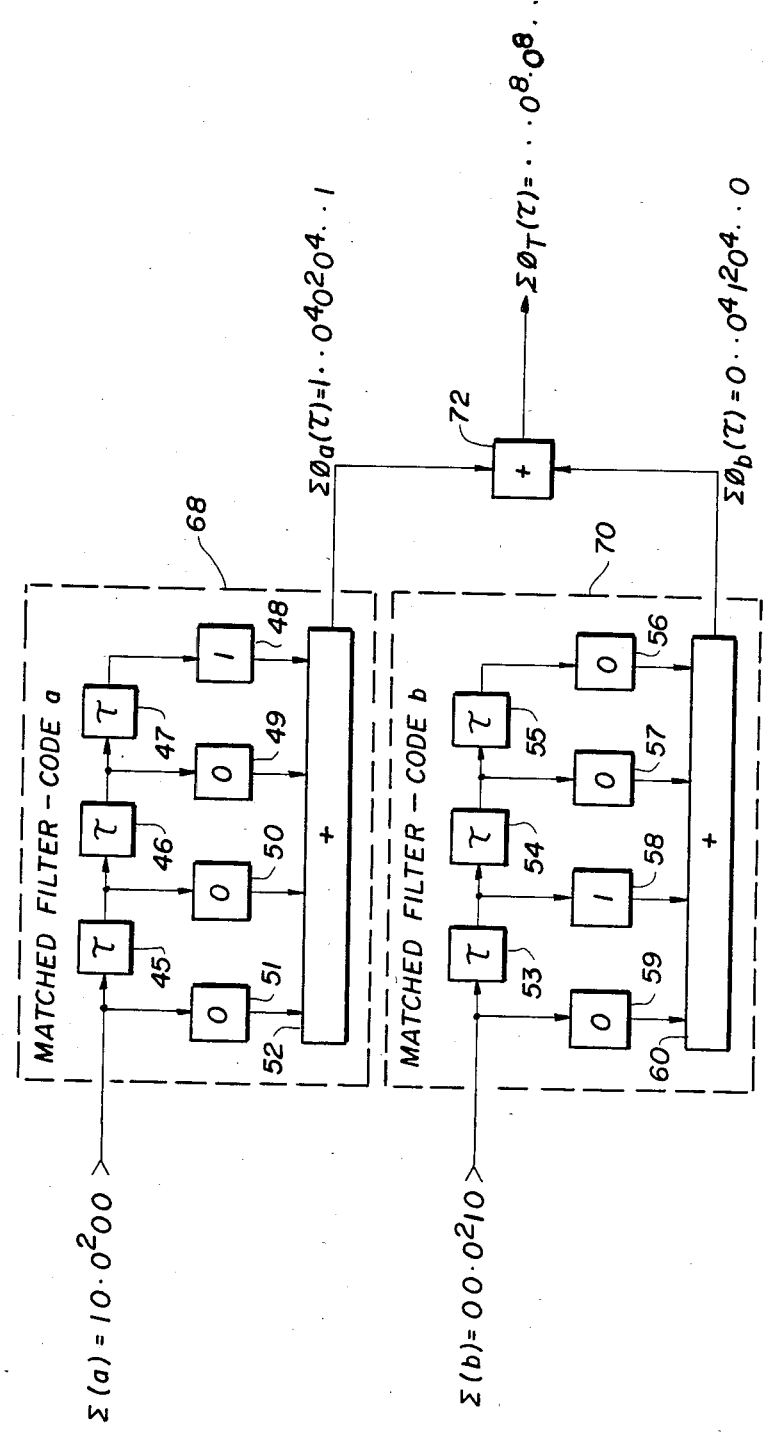

MULTICHANNEL TIME DIVISION MULTIPLEXED TRUNK TRANSMISSION LINK

The invention described herein may be manufactured, used and licensed by or for the Government for governmental purposes without the payment of any royalties thereon or therefor.

FIELD OF THE INVENTION

This invention relates generally to noise code type of communication systems and more particularly to a multichannel time division multiplexed trunk transmission link utilizing code mate pairs having autocorrelation functions which upon detection provide an impulse autocorrelation function.

BACKGROUND OF THE INVENTION

Correlation techniques used in conjunction with noise codes have been utilized in the past in signal processing systems. These noise coded systems include, for example, over the horizon systems employing various types of scatter techniques, satellite communications systems, and the like, and multiple access systems employing address codes to enable utilization of the system. One such system is shown and described in U.S. Pat. No. 3,908,088, entitled, "Time Division Multiple Access Communications System", issued to Frank S. Gutleber, the present inventor, on Sept. 23, 1975.

The correlation and coding techniques employed in this type of communications system results in increased signal-to-noise ratios without any increase of transmitter power. It not only operates to minimize multipath effects, but also obviates interference or cross-talk between the channels while operating with overlapping noise coded signals. Typically, the technique employed utilizes a passive matched filter which pulse compresses a wide pulse to a narrow pulse whose peak amplitude is increased by the number of code bits present in the processed code. Accordingly, the output comprises a single peak of relatively high amplitude having a pulsewidth substantially narrower than the pulsewidth of the received signal without spurious peaks of lower amplitude elsewhere in the waveform.

Furthermore, one class of noise codes are known wherein pairs of coded signals termed "code mates" have autocorrelation functions which upon detection with a matched filter provide a peak output at a given time and a zero output or outputs having the same amplitude with the opposite polarity at all other times. When the code mates are detected and the resultant detected outputs are linearly added, there is provided an impulse output of high amplitude at a given time and a zero output at all other times. Typical examples of means for generating such codes and the utilization thereof in communications systems is typically shown in the following patents issued to the present inventor: U.S. Pat. No. 3,461,451, entitled, "Code Generator To Produce Permutations Of Code Mates", Aug. 12, 1969; U.S. Pat. No. 3,519,746, entitled, "Means And Method To Obtain An Impulse Autocorrelation Function", July 7, 1970; and U.S. Pat. No. 3,634,765, entitled, "System To Provide An Impulse Autocorrelation Function . . . ", Jan. 11, 1972.

Accordingly, it is an object of the present invention to provide an improvement in pulse code communications systems.

Another object of the present invention is to provide an improvement in multichannel time division multiplexed trunk transmission links.

Still another object of the present invention is to provide an improvement in a multichannel time division multiplexed trunk transmission link which provides a large degree of interference or jamming rejection by employing code mates for selected channels which when detected in a matched filter compress to a single impulse containing substantially no side lobes for each selected channel.

SUMMARY

These and other objects are achieved by means of a multichannel time division multiplexed trunk transmission link, the bit stream of which has specific channels of a composite group of channels selectively gated out in the respective time slot and which are then spread spectrum coded as multiplexed noise code mates having a predetermined code length up to the original number of multiplexed channels. The selected noise coded channels are then multiplexed and used to modulate an RF carrier which is transmitted over a transmission link. The modulated RF carrier is received whereupon the code mates are demultiplexed, matched filter detected, and linearly added whereby the codes are compressed to individual channel single bit output signals which are totally non-interfering with one another.

BRIEF DESCRIPTION OF THE DRAWINGS

FIG. 1 is a functional block diagram of transmitter apparatus utilized in a single channel communications link according to the known prior art which employs multiplexed code mate pairs;

FIG. 2 is a functional block diagram of receiver apparatus utilized in the communications link of FIG. 1;

FIG. 3 is a functional block diagram of transmitter apparatus included in a noise modulated communications system in accordance with the principles of this invention;

FIG. 6 is a functional block diagram further illustrative of the matched filter detectors shown in FIG. 5.

DESCRIPTION OF THE PREFERRED EMBODIMENT

Figure 4:
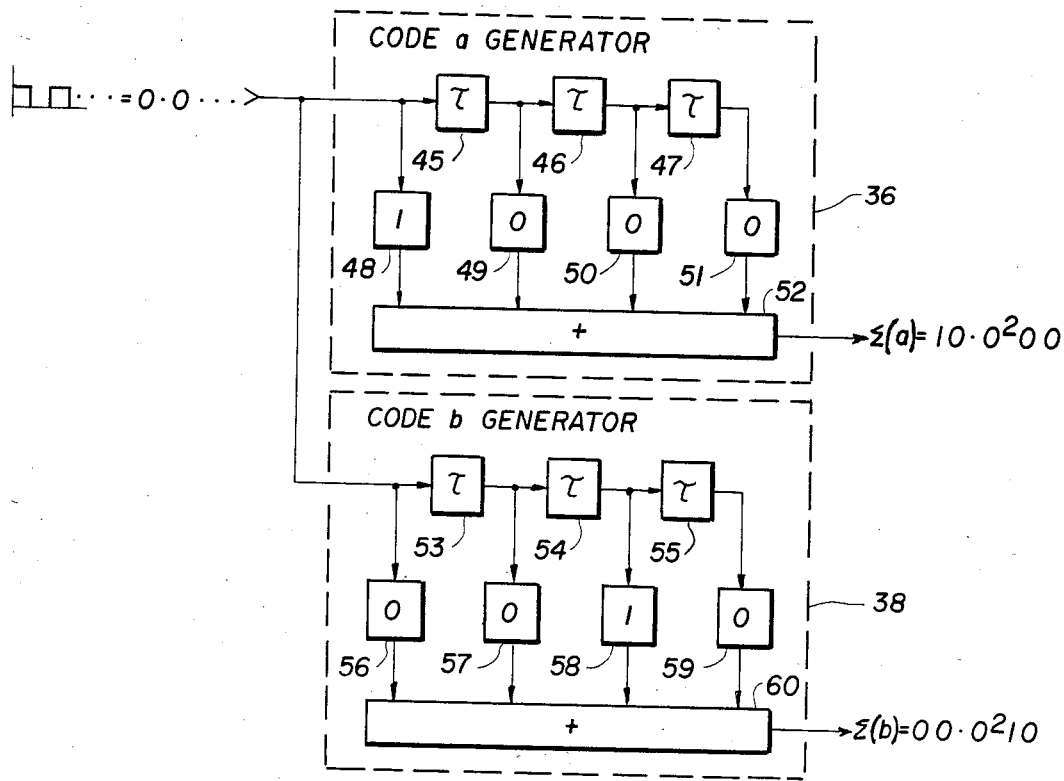
FIG. 4 is a functional block diagram further illustrative of the two code generators shown in FIG. 3.

The present invention is directed to a spread spectrum pulse code modulation communications system employing a type of multibit digital noise code referred to as code mates, meaning that the information is coded with a code that is "noise like" in that it will compress to an impulse when detected with a matched filter. As noted above, one class of noise codes are known wherein pairs of coded signals termed "code mates" have autocorrelation functions which provide a peak output at a given time and a zero output or outputs having the same magnitude but opposite polarity, at all other times. When these code mate signals, for example, are demultiplexed, matched filter detected and linearly added, there is provided a lobeless impulse output of a relatively high amplitude at one given time ($\tau=0$) and a zero output at all other times ($\tau \neq 0$). For a pair of code mates a and b, this may be stated mathematically as, $$\phi_a(\tau) = -\phi_b(\tau) \qquad (1)$$

for all $\tau \neq 0$, where $\phi_a(\tau)$ is the autocorrelation function of code a, $\phi_b(\tau)$ is the autocorrelation function of code b, and where $\tau=0$ is the location of the main lobe. This can be illustrated by the following example.

Consider code mate a and b where $a = 1\ 0\ 0\ 0$ and $b = 0\ 0\ 1\ 0$. The autocorrelation function $\phi_a(\tau)$ of code a can be obtained in a well known fashion by detection in a matched filter. As is well known, a matched filter detector can be implemented by a combination of time delay circuitry, phase control circuits and a linear adder which operates to generate a digital autocorrelation sequence $\phi_a(\tau)$ in the following manner:

$$
\begin{array}{r}
1\ 0\ 0\ 0 \\
1\ 0\ 0\ 0 \\
1\ 0\ 0\ 0 \\
+\ \underline{\phantom{1}\ 0\ 1\ 1\ 1} \\
\phi_a(\tau) = 1\ .\ 0\ 0^4\ 0\ .\ 1 \\
\uparrow \\
\llcorner \!\!-\tau = 0
\end{array}
\qquad (2)
$$

where 0 denotes a pulse of unit amplitude and positive polarity and 1 denotes a pulse of unit amplitude and negative polarity, the . denotes the absence of a pulse, and wherein the exponent signifies the amplitude of the respective pulses. As shown in equation (2), the main lobe ($\tau = 0$) comprises a positive pulse having an amplitude of four times the unit amplitude.

In a similar manner, the autocorrelation function $\phi_b(\tau)$ of code b is generated in its corresponding matched filter as:

$$
\begin{array}{r}
0\ 0\ 1\ 0 \\
1\ 1\ 0\ 1 \\
0\ 0\ 1\ 0 \\
+\ \underline{\phantom{1}\ 0\ 0\ 1\ 0} \\
\phi_b(\tau) = 0\ .\ 1\ 0^4\ 1\ .\ 0 \\
\uparrow \\
\llcorner \!\!-\tau = 0
\end{array}
\qquad (3)
$$

From equations (2) and (3) it can be seen that $\phi_a(\tau) = -\phi_b(\tau)$ for all $\tau \neq 0$, and furthermore, when added together, compress to a lobeless impulse at $\tau = 0$ when linearly added together. This is shown below as:

$$
\begin{array}{r}
\phi_a(\tau) = 1\ .\ 0\ 0^4\ 0\ .\ 1 \\
\phi_b(\tau) = 0\ .\ 1\ 0^4\ 1\ .\ 0 \\
\phi_a(\tau) + \phi_b(\tau) = \phi_T(\tau) = .\ \ .\ \ .\ 0^8\ .\ .\ . \\
\uparrow \\
\llcorner \!\!-\tau = 0
\end{array}
\qquad (4)
$$

A functional block diagram of a single channel communications link employing multiplexed coding of code mate pairs and illustrative of the known prior art is illustrated in FIGS. 1 and 2. As shown in FIG. 1, a binary modulator 10 and a coder-multiplexer 12 comprise clock, synchronizing generator, code generator and mixing apparatus to provide output code signals of code mate pairs a and b, for example, multiplexed in time and which are amplified and modulated on an RF carrier in a block designated power amplifier 14 and thereafter propagated by an antenna 16. Further, as shown in FIG. 2, the RF signals radiated from the antenna 16 are received by an antenna 18 which is coupled to a receiver 20. The receiver 20 outputs an IF signal comprised of the code mate pair signals which are fed to a demultiplexer 22 whereupon the code mates a and b are separated and fed to their respective matched filters 24 and 26. The outputs of the filters 24 and 26 comprise autocorrelation function output signals $\phi_a(\tau)$ and $\phi_b(\tau)$ which are combined in a linear adder 28 to provide a single lobeless impulse output signal $\phi_T(\tau)$. The specific type of multiplexing employed in the communication system of FIGS. 1 and 2 may be of any type by which the code mate signals may be later separated and made orthogonal to each other so as to be non-interfering. The demultiplexer 22 accordingly is consistent with the type of multiplexing employed at the transmitter which, for example, may include time division multiplexing, frequency division multiplexing, quadrature phase modulation, or horizontal and vertical antenna polarization. Thus the preferred approach depends upon the specific application and the user requirements accompanying this use.

Turning now to the present invention, the principles outlined above are applied to a multichannel time division multiplexed (TDM) trunk transmission link coupling a plurality of diversely located transceivers together. As shown in FIG. 3, reference numeral 30 designates a multichannel TDM input apparatus which couples a multibit stream of n channels in a corresponding number of n sequential time slots covering a predetermined time frame period. The multichannel TDM bit stream is coupled to a gate 32 which is controlled by a system control channel selector 34 which is operable to enable the gate 32 to selectively output certain channel bits 1 through n in each time frame period. As shown, two channels (Ch. #1 and Ch. #3) are selected in time slots 1 and 3 while the remaining channels in alloted time slots 2, 4, 5 . . . n are inhibited.

Considering the selected code bits in time slots 1 and 3 as a pulse of unit amplitude and positive polarity, i.e. a 0 signal, the two signals gated out in time slots 1 and 3 are concurrently fed to two code mate generators 36 and 38, the details of which are shown in FIG. 4, whereupon two composite code mates $\Sigma(a)$ and $\Sigma(b)$ are applied to multiplexer 40. The multiplexed code mates outputted by the multiplexer 40 are next coupled to a bi-phase modulator 41 whose output is coupled to an RF output amplifier 42. The output of the RF amplifier 42 in turn is coupled to a transmitting antenna 44 which radiates an RF carrier containing the two composite multiplexed code mates $\Sigma(a)$ and $\Sigma(b)$.

Referring now briefly to FIG. 4, there is disclosed embodiments of the a and b code mate generators 36 and 38. Both the code generators are comprised of a plurality of time delay circuits and a plurality of phase control circuits coupled to a linear adder. More specifically, the code mate generator for generating code a is comprised of three series connected time delay circuits 45, 46 and 47, each having a time delay $\tau$ equal to a pulse width, four phase control circuits 48, 49, 50 and 51 providing a signal feedthrough of either 0° or 180° phase shift (indicated by 0 and 1, respectively) of the specific signal applied thereto, and a linear adder 52. Accordingly, for the selected two channel sequence of 0 . 0 . . . in time slots 1 and 3, the code generator will output the composite binary code $\Sigma(a) = 1\ 0\ .\ 0^2\ 0\ 0\ ...$ The code mate generator for generating code b as shown in FIG. 4 is comprised of three time delay circuits 53, 54 and 55, each having a time delay $\tau$ equal to a pulse width, four phase shifters 56, 57, 58 and 59, phased as shown, and a linear adder 60. In this instance, the same selected two channel sequence of 0 . 0 . . . applied to the input of code generator 38 will output the composite code $\Sigma(b) = 0\ 0\ .\ 0^2\ 1\ 0\ \ldots$ This code generation can be illustrated as shown below.

The two selected channels in time slots 1 and 3 can be illustrated as:

| time slot | 1 | 2 | 3 | 4 | 5 | 6 | 7 | . . . | n |
|---|---|---|---|---|---|---|---|---|---|
| ch #1 = | 0 | . | . | . | . | . | . | . . . | . |
| ch #3 = | . | . | 0 | . | . | . | . | . . . | . |

With the phase shifters set as shown in FIG. 4, codes will be generated such that for each channel sequence applied a=1000 and b=0010. Accordingly, a composite output $\Sigma(a)$ is generated by code generator 36 as:

| time slot | 1 | 2 | 3 | 4 | 5 | 6 | 7 | . . . | n |
|---|---|---|---|---|---|---|---|---|---|
| ch #1 = | 1 | 0 | 0 | 0 | . | . | . | . . . | . |
| ch #3 = | . | . | 1 | 0 | 0 | 0 | . | . . . | . |
| $\Sigma(a) =$ | 1 | 0 | . | $0^2$ | 0 | 0 | . | . . . | . |

In the same manner a composite output $\Sigma(b)$ is generated by by code generator 38 as:

| time slot | 1 | 2 | 3 | 4 | 5 | 6 | 7 | . . . | n |
|---|---|---|---|---|---|---|---|---|---|
| ch #1 = | 0 | 0 | 1 | 0 | . | . | . | . . . | . |
| ch #3 = | . | . | 0 | 0 | 1 | 0 | . | . . . | . |
| $\Sigma(b) =$ | 0 | 0 | . | $0^2$ | 1 | 0 | . | . . . | . |

The codes $\Sigma(a)$ and $\Sigma(b)$ are orthogonally multiplexed and transmitted from the antenna 44 as two overlapped 8 bit noise codes. In general, the total noise code length per channel can be any length up to the number of channels n in the TDM bit stream.

Figure 5:
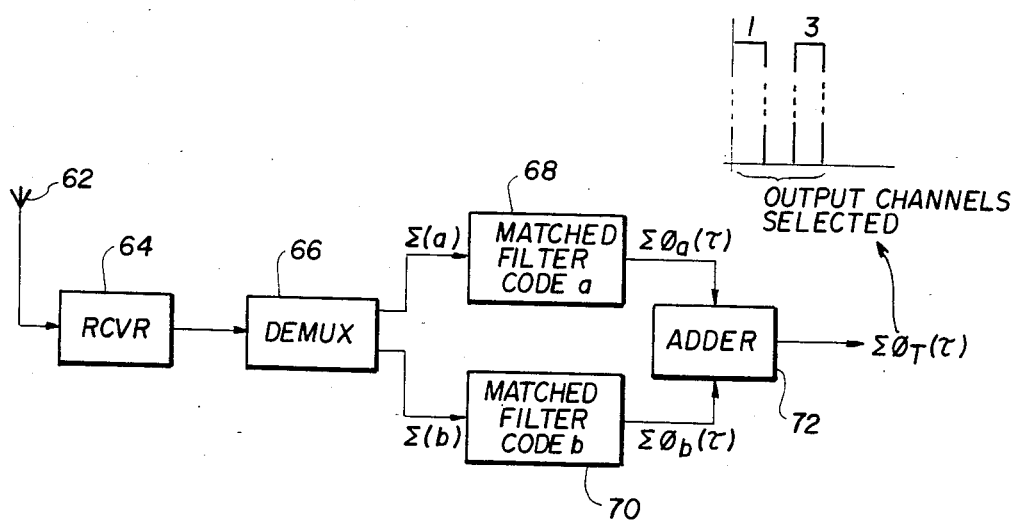
FIG. 5 is a functional block diagram of receiver apparatus utilized in connection with the transmitter apparatus of FIG. 3.

Considering now the receiver, it is shown in FIG. 5 and includes an antenna 62 coupled to a receiver 64 which in turn is coupled to the demultiplexer 66 in the same manner as shown in FIG. 2. The output of the demultiplexer comprises the noise codes $\Sigma(a)$ and $\Sigma(b)$ which are fed to two matched filter detectors 68 and 70. The details of the matched filters 68 and 70 are shown in FIG. 6 and are identical to the corresponding code generators 36 and 38 of FIG. 4 with the exception that the sequence of the phase shifters 48, 49, 50, 51 and 56, 57, 58 and 59 are reversed and operate, as will be shown below, to provide outputs of $\Sigma\phi_a(\tau)=1 \ldots 0^4\ 0^2\ 0^4 \ldots 1$ and $\Sigma\phi_b(\tau)=0 \ldots 0^4\ 1^2\ 0^4 \ldots 0$. These codes are applied to a linear adder 72 which will provide two lobeless output pulses $\Sigma\phi_T(\tau)=0^8\ .\ 0^8 \ldots$ which have an amplitude eight times greater than the input bits applied to the code generators 36 and 38 of FIG. 3.

The manner in which pulse compression and the autocorrelation functions $\Sigma\phi_a(\tau)$ and $\Sigma\phi_b(\tau)$ are generated is shown below. The matched filter detector 68 develops a digital autocorrelation function sequence $\Sigma\phi_a(\tau)$ in the following manner:

$$
\begin{array}{rccccccc}
 & 1 & 0 & . & 0^2 & 0 & 0 & \\
 &  & 1 & 0 & . & 0^2 & 0 & 0 \\
 &  &  & 1 & 0 & . & 0^2 & 0\ 0 \\
 &  &  &  & 0 & 1 & . & 1^2\ 1\ 1 \\
\hline
\Sigma\phi_a(\tau) = & 1 & . & . & 0^4 & 0^2 & 0^4 & . . 1
\end{array} \quad (5)
$$

In a similar manner, the autocorrelation function $\Sigma\phi_b(\tau)$ is developed in matched filter detector 70 as:

$$
\begin{array}{rccccccc}
 & 0 & 0 & . & 0^2 & 1 & 0 & \\
 &  & 1 & 1 & . & 1^2 & 0 & 1 \\
 &  &  & 0 & 0 & . & 0^2 & 1\ 0 \\
 &  &  &  & 0 & 0 & . & 0^2\ 1\ 0 \\
\hline
\Sigma\phi_b(\tau) = & 0 & . & . & 0^4 & 1^2 & 0^4 & . . 0
\end{array} \quad (6)
$$

When $\Sigma\phi_a(\tau)$ and $\Sigma\phi_b(\tau)$ are added together, there is provided the signal $\Sigma\phi_T(\tau)$ which is illustrated below as:

$$
\begin{array}{rccccccc}
\Sigma\phi_a(\tau) = & 1 & . . & 0^4 & 0^2 & 0^4 & . . & 1 \\
\Sigma\phi_b(\tau) = & 0 & . . & 0^4 & 1^2 & 0^4 & . . & 0 \\
\hline
\Sigma\phi_T(\tau) = & . & . . . & 0^8 & . & 0^8 & . . . & 
\end{array} \quad (7)
$$

↑—ch#1 output

↑—ch#3 output

The two major factors to note in the output $\Sigma\phi_T(\tau)$ are that the compressed information bits ($0^8$) for the two selected channels are totally non-interfering and the received signal voltage is eight times greater than the uncoded TDM system. This amplification factor of eight is simply the time bandwidth product or equivalently twice the number of noise code bits included in each mate code.

In the foregoing example, since four code bits were used to implement code generators 36 and 38 (FIG. 4), the resulting gain achieved was eight. The signal to noise power ratio (P/N) or the signal to jammer power (P/J) ratio in a hostile environment is thus increased by the time-bandwidth product n. The improvement reflected in the output (P/N) or (P/J) ratio is readily demonstrated. The signal voltage is coherently summed in the matched filter so that an input voltage V becomes nV at the output. The input noise voltage or jammer voltage interference, however, is totally uncorrelated at the various tap points being summed and therefore increases as a root-mean-square summation. An input interference voltage $\sqrt{N}$ then becomes $\sqrt{nN}$ at the output of the matched filter and the resultant output signal to interference voltage ratio is then $\sqrt{n}V/\sqrt{N}$. The output signal to interference power ratio is simply the square of the output signal to interference voltage ratio or $nV^2/N = nP/N$. Thus if 100 separate users were accessing the system, then the interference power of a jammer would be reduced by 100/1 or 20 db. Simultaneously, the output signal to noise power ratio would be enhanced by 20 db over a TDM system using no coding and the same peak power.

Having thus shown and described what is at present considered to be the preferred embodiments of the invention, it is noted that the same has been made by way of illustration and not limitation. Accordingly, all modifications, alterations and substitutions may be made without departing from the spirit and scope of the invention as set forth in the appended claims.

I claim:

1. A multichannel time division multiplexed communications system including a transmitting end and a receiving end, comprising in combination;
    means located at the transmitting end of said system for generating a time division multiplexed bit stream of a plurality of communications channels in respective time slots of a time frame period;

channel selector control means for selecting a predetermined number of channels less than said plurality of communications channels to be transmitted to the receiving end of said system;

means coupled to said bit stream generating means and being controlled by said channel selector control means for providing as an output said predetermined number of channels as respective bits of said bit stream in each said frame period;

means responsive to each bit of said bit stream for generating a pair of coded signals which upon receipt and detection produces an impulse autocorrelation function signal;

means for multiplexing said coded signals and transmitting multiplexed signals to said receiving end;

means located at said receiving end for demultiplexing said multiplexed signals whereby said pair of coded signals are again provided;

code detector means coupled to said pair of coded signals for producing first and second impulse autocorrelation function signals; and means for adding said first and second autocorrelation function signals to provide respective lobeless impulse output signals of said selected channels.

2. A multichannel time division multiplexed communications system including a transmitting end and a receiving end, comprising in combination:

means located at the transmitting end of said system for generating a time division multiplexed bit stream of a plurality of communications channels in respective time slots of a time frame period;

channel selector control means for selecting a predetermined number of channels less than said plurality of communications channels to be transmitted to the receiving end of said system;

means coupled to said bit stream generating means and being controlled by said channel selector control means for enabling said predetermined number of channels to be provided as respective bits of said bit stream in each frame period;

means responsive to each bit of said bit stream for generating a pair of noise coded signals;

means for multiplexing said noise coded signals and transmitting multiplexed noise coded signals to said receiving end;

means located at said receiving end for demultiplexing said multiplexed noise coded signals whereby said pair of noise coded signals are again provided;

noise code detector means coupled to said pair of noise coded signals for providing a first and second intermediate output signal; and means for combining said first and second intermediate output signals to provide composite output signals of said selected channels.

3. The system as defined by claim 2 wherein said pair of noise coded signals comprise equal length binary noise codes.

4. The system as defined by claim 2 wherein said noise codes comprise binary noise codes which upon detection in a matched filter sense produces an impulse autocorrelation function and wherein said output signals thereby comprise lobeless impulse output signals.

5. The system as defined by claim 4 wherein said noise codes comprise code mate pairs, the autocorrelation function of each being of substantially equal magnitude and opposite polarity or zero for all intervals of time other than during the respective time slot of the respective channel.

6. The system as defined by claim 5 wherein said means for enabling said predetermined number of channels to be provided comprises a bit stream gate circuit.

7. The system as defined by claim 5 wherein said noise code detector means comprises a pair of matched filters.

8. The system as defined by claim 5 wherein said detector means comprises autocorrelation function detector means including a pair of adder circuits, a plurality of time delay circuits for successively delaying the application of said noise coded signals to input terminals of said adder by one interval of time each and a plurality of phase control circuits for reversing the polarities of the signal supplied thereto in accordance with the code pattern generated at said transmitting end.

9. The system as defined by claim 8 and wherein said means for combining comprises an adder circuit.

* * * * *